Patented Nov. 14, 1944

2,362,471

UNITED STATES PATENT OFFICE 2,362,471

PARASITICIDE

Robert R. Dreisbach and Fred W. Fletcher, Midland, Mich., assignors to The Dow Chemical Company, Midland, Mich., a corporation of Michigan No Drawing. Application December 16, 1941, Serial No. 423,178

5 Claims. (Cl. 167—32)

This invention relates to parasiticidal materials, and particularly to compositions in which an alkyl-substituted mononitro-naphthalene is employed as an active toxic ingredient.

Many synthetic organic materials have been suggested for use as parasiticidal toxicants and as substitutes for pyrethrum, rotenone, nicotine sulfate, metallic arsenates, and other common parasiticidal products. Almost without exception these new materials have been insufficiently effective or so injurious to plant foliage that they have not been widely accepted in such use. Other disadvantages accruing to many of the synthetic toxicants heretofore employed have been their toxicity to humans and incompatibility with other parasiticidal materials.

Naphthalene has been widely publicized as an insecticidal and parasiticidal toxicant, but has been generally unsatisfactory because of its relatively low toxicity whereby such large amounts thereof are required to accomplish commercial parasiticidal control as are economically impractical. Furthermore, naphthalene appears to operate essentially in the vapor phase and as a fumigant which greatly limits the scope of its application.

According to the present invention compositions comprising alkyl-substituted mononitro-naphthalenes in combination with inert diluents have been found very effective as parasiticidal toxicants. Compositions comprising sufficient of these naphthalene derivatives to accomplish the control of many insects may be applied to growing foliage according to standard spraying and dusting procedures without causing material injury thereto.

Any suitable amounts of the alkyl-mononitro-naphthalenes may be employed in the compositions of the present invention. From about 0.1 to about 20 per cent by weight of the toxicant in the composition is preferred. Higher percentages, however, may be used in concentrates adapted to be further diluted with liquid or solid carriers to produce spray or dust compositions. The alkyl-substituted mononitro-naphthalene products as herein employed are liquids or low melting solids, substantially insoluble in water, soluble in many organic solvents, readily adsorbed or absorbed by common finely divided diluents, relatively nontoxic to humans and relatively non-reactive with other parasiticidal materials.

The alkyl-substituted mononitro-naphthalenes which are employed as toxicants in accordance with the present invention may be prepared by subjecting previously separated alkyl naphthalene products to treatment with a mixture of nitric and sulfuric acids at temperatures not greatly in excess of 50° C. to obtain a crude reaction product comprising the alkylated mononitro-naphthalenes. The crude reaction products so obtained are adapted to be employed as toxicants without further purification, although, if desired, they may be fractionally distilled under reduced pressure to separate substantially pure alkyl-mononitro-naphthalenes. In any event, the products obtained are generally mixtures of isomers and homologs rather than isolated chemical compounds.

The new toxicants may be employed in different types of compositions to accomplish the control of common parasites and particularly agricultural insect pests. The determining factors with respect to the particular adaptation employed are the type of insect to be controlled, the circumstances under which such control is to be accomplished, and the tolerance of the host plant for the particular carriers or addition agents employed with the naphthalene derivatives. For example, the alkylated mononitro-naphthalenes may be employed as toxicants in oil emulsions. They may also be employed in water suspension with a suitable emulsifying or dispersing agent. If desired, they may be adsorbed on or absorbed in finely divided carriers such as diatomaceous earth, bentonite, talc, wood flour, etc., to obtain compositions adapted to be employed either as dusts, or as concentrates in the preparation of water suspensions. A further modification consists of dissolving the toxicant in any suitable organic solvent such as alcohol, acetone, liquid chlorinated hydrocarbons, pine oil, fatty acid, glycerides, and the like, and thereafter employing the solution either alone or in suitable combination. The products may be incorporated in other standard type insecticidal compositions either as the sole toxic ingredient of such compositions or in combination with common insecticidal materials such as lead arsenates, pyrethrum, rotenone, organic thiocyanates, phenothioxins, esters of polycarboxylic acids, and the like.

The following examples are illustrative both with respect to the alkyl-substituted mononitro-naphthalenes employed and composition types but are not to be construed as limiting the invention:

EXAMPLE 1

103 grams of 60 per cent nitric acid and 300 grams of 80 per cent sulfuric acid were mixed together and 156 grams of liquid isomeric monoethyl-naphthalene fraction boiling at 256°–260° C. at atmospheric pressure was added thereto with stirring at a temperature of between 40° and 50° C. After the addition was complete, the mixture was heated at 50° C. for 6 hours and thereafter at 60° C. for 6 hours. The resulting oily product was washed with water and fractionally distilled whereby there was obtained 143 grams of a liquid monoethyl-mononitro-naphthalene fraction boiling at 168°–185° C., and principally at 175° C. at 10 mm. pressure. This product contained 6.5 per cent nitrogen by analysis.

20 parts by weight of the foregoing monoethyl-mononitro-naphthalene mixture was homogenized with 20 parts by weight of sodium lauryl sulfate to obtain a parasiticidal concentrate adapted to be employed in the preparation of either spray or dust compositions. When diluted with sufficient water to give a toxicant concentration of 2 pounds per 100 gallons, a spray material was obtained which gave a kill of 93 per cent against adult red spiders and 92.5 per cent against brown chrysanthemum aphis.

Similar compositions in which naphthalene, acenaphthalene, 1.8-dinitro naphthalene, dichloro-naphthalene, and monochloro-naphthalene were employed gave kills against adult red spider of 11.9, 16.2, 1.2, 69.2, and 21.7, respectively; and kills against brown chrysanthemum aphis of 55, 50, 6, 32.5, and 52.4, respectively.

EXAMPLE 2

The liquid mixture of isomeric monoethyl-mononitro-naphthalenes described above was compounded with various wetting and dispersing agents and carriers to produce the following compositions:

Composition A

| | Parts by weight |
|---|---|
| Ethyl-nitro-naphthalene | 60 |
| Partially neutralized sulfonated sperm oil | 10 |
| Emulphor EL (condensation product of organic acids and ethylene oxide) | 10 |
| Pine oil | 10 |
| White petroleum oil | 10 |

Composition B

| | Parts by weight |
|---|---|
| Ethyl-nitro-naphthalene | 60 |
| Light lubricating oil | 20 |
| Partially neutralized sulfonated sperm oil | 10 |
| Emulphor EL | 10 |

Composition C

| | Parts by weight |
|---|---|
| Ethyl-nitro-naphthalene | 65 |
| Light lubricating oil | 20 |
| Emulphor EL | 15 |

Composition A when dispersed in water in such amount as to give 2 pounds of the ethyl-nitro-naphthalene per 100 gallons was found to give a 95 per cent control of lily aphis. Composition B when similarly employed gave a control of 99 per cent of lily aphis, and good control against rose aphis. This composition in water dispersion at 2 pounds of toxicant per 100 gallons gave 100 per cent control of adult red spider. At 1 pound per 100 gallons, the control against red spider was 92.7 per cent. Composition C in aqueous dispersion at 2 pounds of toxicant per 100 gallons gave a control of 100 per cent against adult red spider.

EXAMPLE 3

206 grams of 60 per cent nitric acid and 600 grams of 80 per cent sulfuric acid were mixed together on a water bath and 368 grams of diethyl naphthalene fraction boiling at 288°–292° C. at atmospheric pressure added thereto with stirring at a temperature of between 40° and 50° C. After the addition was complete, the mixture was heated for an additional 8 hours at from 50°–60° C. and thereafter successively washed with dilute alkali and water to neutralize acid and to remove inorganic products of the neutralization. The crude product was dried to remove water, whereby there was obtained a theoretical yield of a reaction mixture consisting essentially of diethyl-mononitro-naphthalene. This product had a nitrogen analysis of 6.11 per cent by weight.

60 parts by weight of the foregoing diethyl-mononitro-naphthalene product, 20 parts by weight of white petroleum oil, 10 parts by weight of partially neutralized sulfonated sperm oil, and 10 parts by weight of Emulphor EL were mixed together to obtain a liquid concentrate adapted to be employed in the preparation of aqueous parasiticidal sprays. A portion of this concentrate was diluted with sufficient water to give a concentration of 2 pounds of the diethyl-mononitro-naphthalene product per 100 gallons and thereafter applied for the control of various plant parasites. Against red spider this product gave a control of 100 per cent. A 98 per cent kill of lily aphis and a good control of *Aphis rumicis* were obtained with the same composition.

In a similar manner, the alkyl substituted mononitro-naphthalenes may be compounded with other wetting agents, dispersing agents, and carriers to obtain analogous compositions. Representative of the wetting and dispersing agents which may be so employed are bentonite, sulfonated alkyl phenyl-phenols and their salts, metal caseinates, metal naphthenates, glyceryl oleate, and the like. Solid carriers such as diatomaceous earth, volcanic ash, pyrophyllite, gypsum, wood flour, etc., are adapted to be used in combination with the toxic principle.

Other alkyl-substituted mononitro-naphthalenes which may be substituted for those shown in the examples include dimethyl-mononitro-naphthalenes, tri- and tetra-ethyl-mononitro-naphthalenes, monopropyl-mononitro-naphthalenes, mono- and polybutyl-mononitro-naphthalenes, monoamyl-mononitro-naphthalenes, monohexyl-mononitro-naphthalenes, monooctyl-mononitro-naphthalenes, and higher homologs or mixtures of two or more of such compounds. The toxicants with which the present application is primarily concerned may be generically identified by the following formula

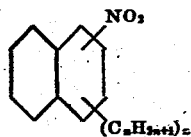

wherein $n$ is an integer. The preferred embodiment of the invention resides in liquid or low melting mixtures of isomeric and/or homologous compounds falling within the foregoing formula.

We claim:

1. An insecticidal composition comprising as an active toxicant an alkyl-substituted mononitro-naphthalene and a carrier therefor.

2. An insecticidal composition comprising an inert diluent carrying as an active toxicant a compound having the following formula

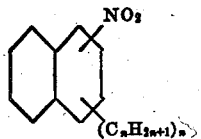

wherein $n$ is an integer.

3. An insecticidal composition comprising an inert diluent carrying as an active toxicant a compound having the following formula

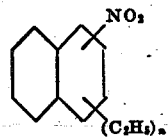

wherein $n$ is an integer.

4. An insecticidal composition comprising an inert diluent carrying as an active toxicant a compound having the following formula

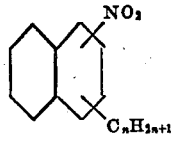

wherein $n$ is an integer.

5. An insecticidal composition comprising an inert diluent carrying as an active toxicant a compound having the following formula

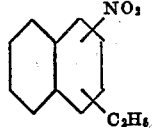

ROBERT R. DREISBACH.
FRED W. FLETCHER.